Oct. 27, 1959    D. F. KING ET AL    2,910,044
PROCESS AND PLANT FOR RAISING POULTRY AND THE LIKE
Filed May 24, 1956    2 Sheets-Sheet 1
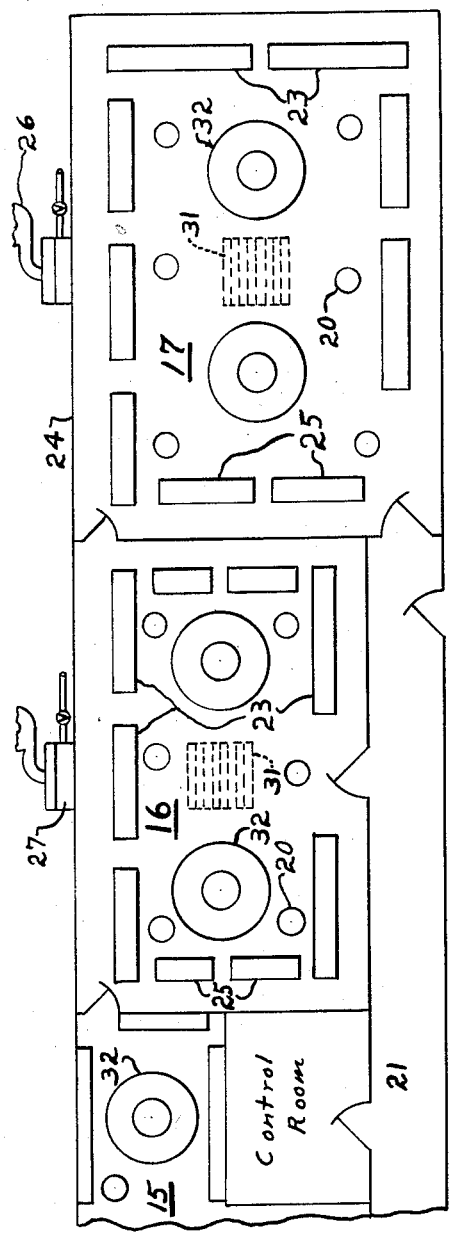
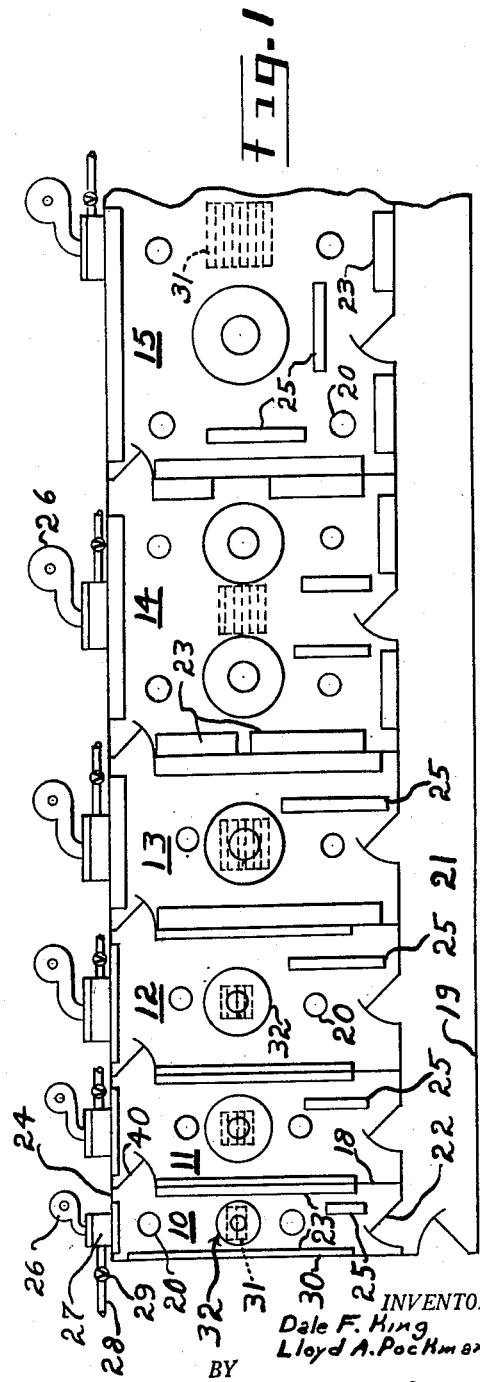
INVENTOR.
Dale F. King
Lloyd A. Pockman
BY
Jennings & Carter
Attorneys

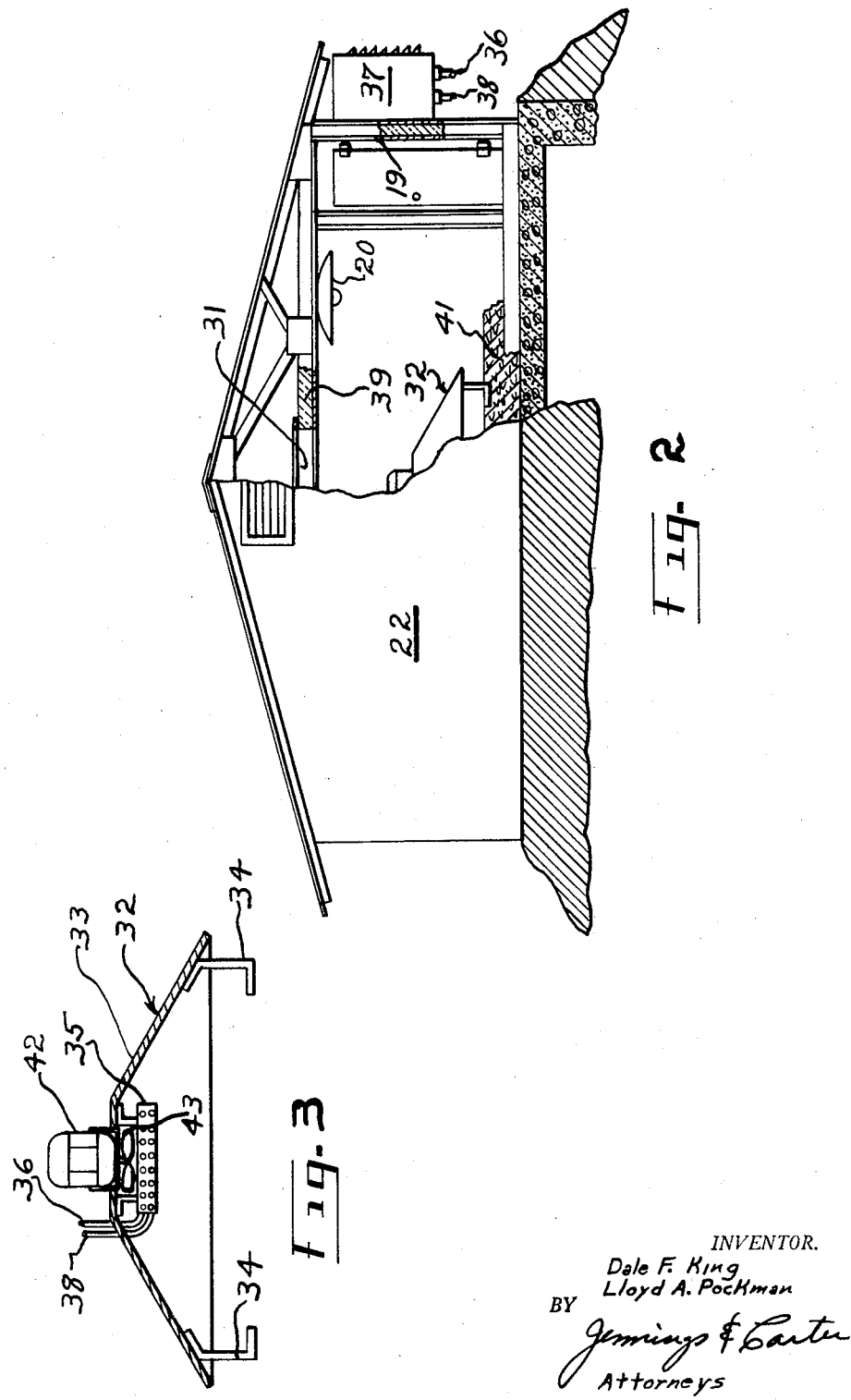

United States Patent Office 2,910,044
Patented Oct. 27, 1959

---

2,910,044

PROCESS AND PLANT FOR RAISING POULTRY AND THE LIKE

Dale F. King, Auburn, and Lloyd A. Pockman, Decatur, Ala.

Application May 24, 1956, Serial No. 586,943

3 Claims. (Cl. 119—1)

Our invention relates to a process and plant for raising poultry, and has for an object the provision of such process and plant by means of which poultry may be raised from day old size to marketable size and age at a minimum overall total cost per pound and in minimum time.

In the art to which our invention relates it is known that many environmental conditions affect the rate of growth, general health and overall condition of poultry. For instance, it is known that many variables such as the amount of light, the temperature, and ventilation existing in the living space of chickens all affect optimum growing conditions of chickens from day old up to around 8 or 9 weeks in age. It is variously suggested in the literature on the subject that there might be some relation between these factors of light, temperature, ventilation and humidity. Insofar as we are aware there has never been disclosed any practical way to put to use any relative relationships between these factors which would result in decreasing the overall cost of producing poultry meat.

With the foregoing in mind one of the objects of our invention is to provide a process for raising chickens from one day old through broiler age of 8 to 9 weeks which comprises controlling all of the foregoing factors within limits and which further comprises allotting to each chicken a definite amount of living area which varies from approximately .16 square foot per chicken during the first week of the growth period to approximately 1 square foot per chicken during the eighth week of the growth period.

Another object is to control the ventilation provided for each age group of chickens within a range to maintain minimum adequate fresh air, thus reducing the cost of heating or cooling the living space for the chickens.

Another object of our invention is, simultaneously with gradually increasing the living room for the chickens, to decrease the living room temperature from around 90 degrees F. during the first week to around 70 degrees F. during approximately the fifth through the eighth weeks, while simultaneously with said temperature change varying the periods of light and darkness within the limits hereinafter set forth, all to the end that the overall environmental conditions in which the chickens live are such that maximum growth with minimum feed requirements is attained.

It is a further object of our invention to provide a process for raising chickens and the like in which by definitely controlling the periods of light and darkness, cannibalism among the chickens is substantially eliminated, eliminating the requirement of debeaking the chickens.

A further object of our invention is to provide a process of the character indicated in which there is maintained in each room in which the chickens are housed and when necessary a zone of cool air surrounded by a zone of warmer air, these zones being maintained close to the floor level, whereby the chickens themselves may select the most comfortable temperature zone, thus promoting not only optimum consumption of feed by each chicken but also providing an environmental temperature zone ideally suited to each individual chicken.

A further object of our invention is to provide a plant embodying a building and certain equipment which is particularly suited, although not essential, for the carrying out of our improved process and which has certain constructional advantages which will hereinafter be more specifically pointed out.

Briefly, our invention may be carried out by providing a house in which the chickens are to be kept. The house may conveniently be divided by partitions whereby there are provided rooms of different total floor areas. Each of these rooms may be provided with a source of heat, a source of fresh air, a source of cool air, means to control the light, and preferably means to control the humidity of the air in the rooms. The building may be windowless, thus saving a considerable amount in construction cost. Day old chicks are started in our process by placing them in the smallest room of the building. The temperature over a part of the floor, and in what we will hereinafter sometimes refer to as a "comfort zone," preferably is maintained in the range of 89° to 94° F. We maintain light in the room 24 hours per day during the first week of the growing cycle. In the room for week old chicks we change the air approximately each 30 minutes. We maintain the relative humidity of the air in this room within the range of 30% to 70%. At the end of the first week the chickens are moved to the second room in the building where the foregoing conditions are varied as will hereinafter be explained. Each week the entire flock of chickens is moved to the next room, each of which is larger in total square feet than the preceding one. It will thus be seen that a new group of chickens can be started each week and that no space is wasted in carrying out our improved process. We proportionately increase the square footage allotted to each chicken as it increases in size and age.

A plant illustrating the constructional features of our invention and which may be used to carry out our improved process is shown in the accompanying drawings forming a part of this application in which:

Fig. 1 is a wholly diagrammatic plan view of a chicken house equipped with some of the novel features of our invention and which may be used to carry out our process, the figure being the left hand end of the house;

Fig. 1a is a view similar to Fig. 1 and showing the right hand end of the building as the same is viewed in said Fig. 1;

Fig. 2 is an end elevational view of the building partly in section; and,

Fig. 3 is an enlarged detail sectional view through one of the air cooling units.

Referring now to the drawings for a better understanding of our invention we show in Figs. 1, 1a and 2, a building which may be generally rectangular in shape. By way of example the building may be 24 feet wide, approximately 265 feet long, and seven feet from floor to ceiling. The building is windowless, and the doors into the various rooms are made fairly air tight and substantially light proof.

At the left hand end of the building, Fig. 1, we show a room 10 which is designated as the room for the first week of the growing period, a room 11 the second week, room 12 for third week, room 13 for fourth week, and so forth, through room 17, which last numbered room is the one for chickens eight weeks old. In view of the fact that except for size the rooms are substantially identical, a description of the smaller one will, except as noted, suffice for all. It will first be seen that room 10 is separated from room 11 by a partition wall 18. The building may conveniently have an outer wall 19 which defines a walkway or hall 21. A door 22 opens from the hall 21 into room 10, whereby the attendant may gain access to the room.

Near wall 18 and near the end wall 30 of the building we may place feeder troughs 23 whereby there is available, at all times, an adequate supply of feed. It will also be understood that there is provided at all times in all the rooms an ample supply of water in standard watering troughs indicated diagrammatically at 25.

Placed on the outside of the outer wall 24 of the building to discharge thereinto is an air fan 26. The fan may blow air over a heater coil 27 to which a heating medium may be supplied from a source, not shown, through a pipe 28 under control of a valve 29. In the ceiling of the room 10 is an air vent 31. In the room 10 we provide a source of light which is indicated diagrammatically by the incandescent electric lamps 20. There may be a small door 40 in the wall 18 through which the chickens may be passed to the next room 11 as will be explained.

In the room 10 and in all the other rooms, we may place our improved air cooling unit indicated generally by the numeral 32, see Fig. 3. In addition rooms 10, 11 and 12 may be provided with any desired source of heat at the floor level. The air cooling unit 32 may consist of an inverted shell-like housing 33 which is supported above the floor level on legs 34. In the upper part of the housing we provide a cooling coil 35. Coolant may be supplied to the coil 35 through a conduit 36 from a compressor unit 37 located on the outside of the building as shown in Fig. 2. A return line for the system is indicated at 38.

Mounted above the cooling coil 35 is an electric motor 42. A fan 43 is driven by the motor and circulates air through the cooling coil, to cool the air.

The building preferably is insulated throughout its walls as well as overhead as indicated at 39. In addition we prefer to place on the floor a layer of material such as dry pine shavings 41 or the like as is customary.

With the foregoing construction in mind it will be seen that we are enabled to place a batch of chickens in room 10, maintain them there under the ideal environmental conditions set forth herein and then to move them to the next room, and so on. By way of example a satisfactory building having an overall width of twenty-four feet, and divided into eight rooms as indicated will accommodate a continuous production cycle of 1000 chickens per week through eight weeks old, that is, to broiler size. To accomplish this we divide the building in such manner that room 10 is eight and one-half feet long; room 11 thirteen feet long; room 12 sixteen feet long; room 13 twenty-six feet long; room 14 forty feet long; room 15 sixty-eight feet long; room 16 fifty-two and one half feet long; and room 17 forty-one and one-half feet long. We prefer to place in one of the rooms, for instance room 15, all of the controls for all of the rooms and we have thus increased the total square footage in that room to make up for the space used as a control room. It will be noted from Figs. 1 and 1a that all of the rooms except room 17 are nineteen feet wide, whereas room 17 is as wide as the building, a full twenty-four feet wide.

As an example of the advantages of our invention, we started, in a room similar to but proportionately smaller than room 10, 400 Vantress X New Hampshire day-old chicks. These were obtained from a hatchery 175 miles away from the place where we had constructed our improved plant. The chickens were shipped in the standard chick boxes and were started at 6 p.m., January 19, 1956. Since this room was 7 by 9 feet this was a total allocation of .16 square foot per chick. During the first week the average temperature in room 10 was 70° to 75° F. However, due to the presence of the floor level heat sources, the chicks had access to floor level areas heated to around 94° F. We maintained 24 hours of light and no hours of darkness during the first week. We so regulated the blower 26 that we completely changed the air in said room once every 30 minutes. The humidity was maintained at about 40%, relative. At the end of the first week the chickens were moved into a room similar to but proportionately smaller than room 11, and so on through the eighth week.

The following table shows the relationship of the square footage per bird, the average room temperature, the amount of ventilation, and the average humidity throughout the eight weeks growth period:

| Age, wks. | Encl. in sq. ft. | Sq. ft. per chicken | Average room temp. | Ventilation changes per hr. | Average humidity | Light schedule in hours |
|---|---|---|---|---|---|---|
| 1 | 7 x 9 | .16 | 74 | 2 | 40 | 24L, OD. |
| 2 | 10 x 10 | .25 | 75 | 3.9 | 40 | 24L, OD. |
| 3 | 10 x 12 | .30 | 73 | 6.5 | 62 | 21L, 3D. |
| 4 | 10 x 20 | .50 | 70 | 11.5 | 60 | 9L, 3D, 9L, 3D. |
| 5 | 15 x 20 | .75 | 69 | 13 | 61 | 5L, 3D, 5L, 3D, 5L, 3D. |
| 6 | 20 x 20 | 1.00 | 68 | 11.5 | 56 | 3L, 3D, 3L, 3D, 3L, 3D, 3L, 3D. |
| 7 | 20 x 20 | 1.00 | 72 | 13.5 | 61 | 2L, 3D, 2L, 3D, 2L, 3D, 2L, 3D, 1L, 3D. |
| 8 | 20 x 20 | 1.00 | 69 | 15.5 | 67 | 1L, 3D, 1L, 3D, 1L, 3D, 1L, 3D, 1L, 3D, 1L, 3D. |

A study of this table will show that during the first week we supplied relatively little ventilation to the chicks whereas during the second week we operated the fan at such rate as to change the air approximately 3.9 times per hour. During the fourth week this figure was raised to 11.5 and during the fifth week to 13. During the sixth week, it became necessary to operate the cooling unit 32 in the room corresponding to room 15. We found it desirable to decrease the changes of air in numbers of time per hour to 11.5.

In the particular flock of chickens which we have raised by our improved process and with our improved plant we started with the type of chicks heretofore mentioned which cost 16¢ each. The following table sets forth the percentage of mortality, average weight in pounds at the ends of the periods, feed consumed in pounds per pound of gain, total chick and feed cost, and total cost per pound of broiler at the end of each weekly period.

| Age, wks. | Percent mort. | Av. wt., lbs. | Feed cons. to date | Feed cons., lbs. per lbs. gain | Total chick and feed cost | Broiler cost per lb. |
|---|---|---|---|---|---|---|
| 1 | ¼ of 1 | | | | | |
| 2 | 0 | 0.44 | 300 | 1.67 | $80.20 | $0.45 |
| 3 | 0 | .73 | 500 | 1.70 | 91.00 | 0.30 |
| 4 | 0 | 1.12 | 850 | 1.84 | 109.90 | 0.24 |
| 5 | 0 | 1.70 | 1,250 | 1.80 | 131.50 | 0.19 |
| 6 | 0 | 2.20 | 1,700 | 1.90 | 155.80 | 0.174 |
| 7 | 0 | 2.71 | 2,250 | 2.04 | 185.50 | 0.168 |
| 8 | 0 | 3.20 | 2,800 | 2.15 | 215.20 | 0.164 |

None of the chicks were debeaked, and half were male and half were female. Our weights were determined by weighing one-fourth of all the chicks, individually, one-half males and one-half females, at the end of the weekly periods as indicated.

By comparison with the figures just set forth it will be obvious to those skilled in the art that we have considerably reduced the cost per pounds of meat by our improved process over the national average among skilled poultrymen. For instance, an official three year summary of results of a typical closely controlled experiment shows that during 1955 with 210,616 chickens the average feed consumption per pound of meat produced was 2.63 pounds. The average age at which the broilers were sold was 9 weeks 3 days whereas with our improved process we sell them at the end of 8 weeks. The average weight of the closely controlled experiment was 2.84 pounds at the end of 9 weeks 3 days, whereas the average weight of the chickens raised by our improved process at the end of 8 weeks was 3.20 pounds. The cost per pound of meat in the 1955 closely controlled experiment was 19.1¢ whereas in ours it is 16.4¢. We note no major difference in the cost of feed or the cost of chicks as between the two examples.

In observing chickens in our improved plant and when being raised by our improved method we note that around each of the cool air units 32 there is a zone, outside said hood, which appears to be perfectly comfortable for the chickens. That is to say, the chickens seem naturally to move into that zone which is the most comfortable for them temperature-wise. By placing the units 32 in each room so that cool air is supplied thereby it is not necessary to cool the air of the entire building or room. The chickens come close enough to the edges of the coolers 32 as for each individual chicken is most comfortable, remain there for a few minutes, then move over to the feed troughs where they consume as much feed as they desire. When they become too warm they move back to the cooler area. This arrangement eliminates the necessity of having to cool the entire volume of air in each room, the cost of which would be extremely high. At the same time it affords a flexible comfort zone wherein the individual chickens, depending upon how each one is feathered out, may find the most comfortable place and hence the place most conducive to high feed intake and rapid growth.

In carrying out our tests we fed the chickens feed suitable for the particular age, the type and kinds of which will be apparent to those skilled in the art. The chicks were not vaccinated for any disease but were fed a drug to prevent coccidiosis through the growth period. An example of such drug is sold under the trade name "Nicarbazin" by Merck and Company, Inc. By following the light schedule as indicated in the table for the different ages, we substantially eliminated cannibalism and hence eliminated for all practical purposes losses of chickens from this cause.

From the foregoing it will be apparent that we have devised an improved process and plant for the economical production of chickens. In actual tests we have found that our invention saves approximately 15% in the cost of producing chickens over the best processes and methods heretofore known to us. Our improved plant is particularly advantageous and the apparatus for maintaining a temperature comfort zone which eliminates the necessity of cooling the air of an entire room is important and represents a considerable saving in investment.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In a plant for raising chickens from approximately one day old to broiler size, an elongated building divided into a plurality of separate substantially light proof enclosures, each of said enclosures commencing with the first increasing in square footage of floor area, and the first one having a square footage of floor area equaling approximately .16 square foot per chicken, an air circulator in communication with said enclosures to change the air periodically in said enclosures, and a cooler within said enclosures to maintain over a part of the floor area of each of the said enclosures a zone of air which is cooler than the surrounding air over the remainder of the floor thereof.

2. A plant as defined in claim 1 in which there are doors between each of the enclosures through which chickens may be passed from one enclosure to the other.

3. A plant as defined in claim 1 in which the cooler to maintain said cool air adjacent the floor comprises a generally inverted housing supported above the level of the floor, an air cooling coil in said housing, a supply conduit connecting with said coil for supplying coolant thereto, and a blower adjacent said coil to force air around the outside of the coil.

References Cited in the file of this patent

UNITED STATES PATENTS

| | | |
|---|---|---|
| 1,563,647 | Pemberton | Dec. 1, 1925 |
| 1,808,364 | Martin | June 2, 1931 |
| 1,827,530 | Le Grand | Oct. 13, 1931 |
| 1,995,213 | Martin | Mar. 19, 1935 |
| 2,200,901 | Smith et al. | May 14, 1940 |
| 2,646,930 | Dryden | July 28, 1953 |